Jan. 21, 1930.  H. G. SMITH  1,744,340
LOCK
Filed July 23, 1928  2 Sheets-Sheet 1

INVENTOR
Harry G. Smith
BY
P. W. Pomeroy
ATTORNEY

Jan. 21, 1930.  H. G. SMITH  1,744,340
LOCK
Filed July 23, 1928   2 Sheets-Sheet 2
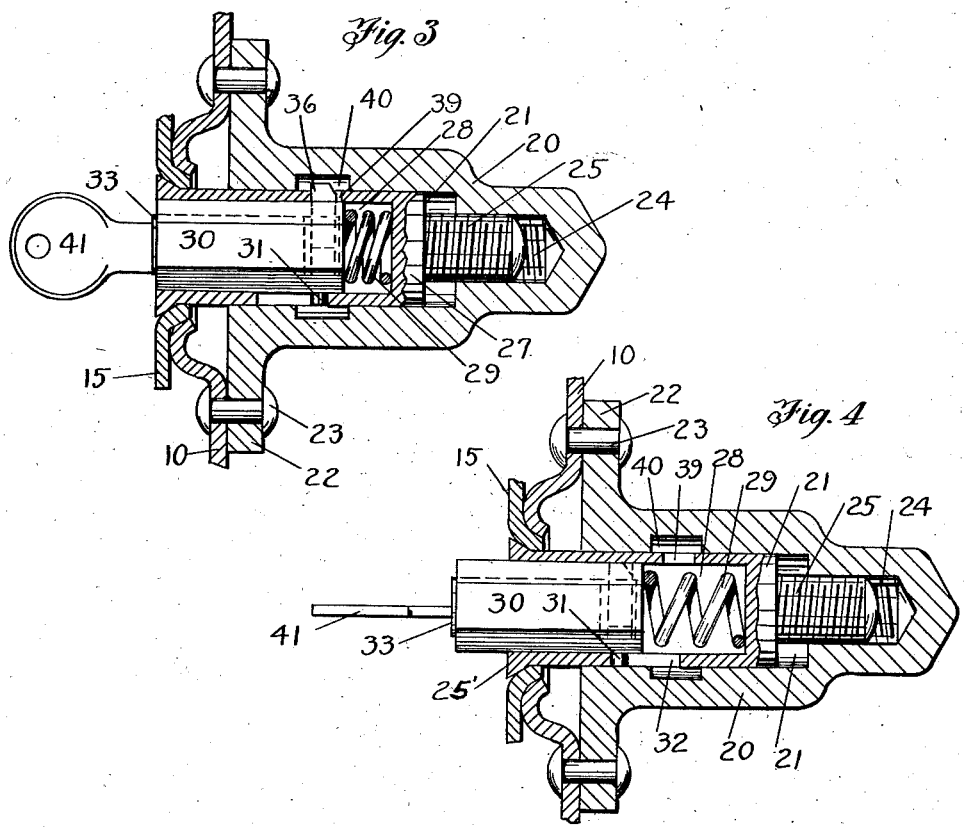
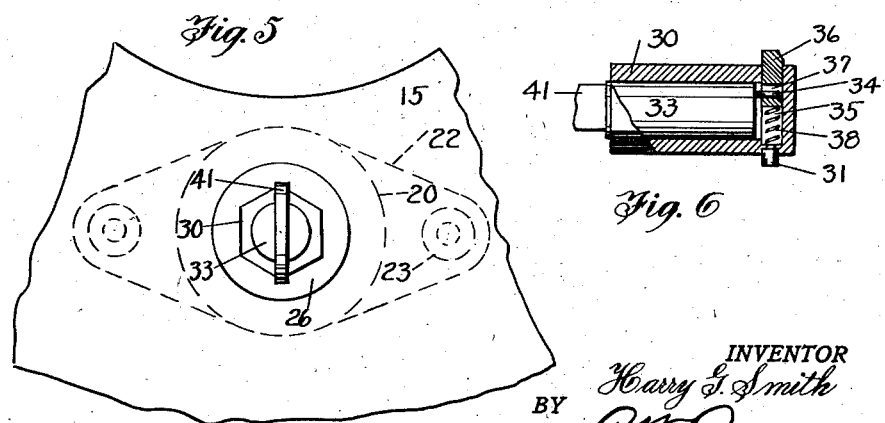
INVENTOR
Harry G. Smith
BY
P. N. Pomeroy
ATTORNEY Patented Jan. 21, 1930

1,744,340

UNITED STATES PATENT OFFICE

HARRY G. SMITH, OF MISHAWAKA, INDIANA, ASSIGNOR TO THE STUDEBAKER CORPORATION, OF SOUTH BEND, INDIANA, A CORPORATION OF NEW JERSEY

LOCK

Application filed July 23, 1928. Serial No. 294,703.

This invention relates to locks and more particularly to the type adapted to lock the spare wheel of a motor vehicle to the vehicle wheel carrier in order to prevent the same from being stolen.

Heretofore, no lock has ever been used which would successfully prevent the theft of spare wheels from the wheel carriers. All of those previously used were of such a type that the thief attempting to steal the wheel and tire could easily secure or adjust a wrench, wrecking tool, bolt clipper or similar device to a projecting part of the lock to either break or twist the lock and its associated parts.

It is therefore, the principal object of this invention to provide a new and novel means for locking the spare wheel to a vehicle wheel carrier which means is simple in construction, easy to assemble and economical to manufacture.

Another object is to provide a motor vehicle with a spare wheel carrier having a lock therein, which, when in locked position, is flush with a surface of the wheel.

Another object is to provide a motor vehicle with a spare wheel carrier having bolts for securing the spare wheel to the carrier, one of the bolts being provided with means for locking the same against rotation.

Another object is to provide a spare wheel carrier for a motor vehicle with a securing bolt having a key-operated lock therein and a plunger operated by the lock and adapted to engage a portion of the wheel carrier whereby the bolt may be locked against rotation.

A further object is to provide a spare wheel carrier for a motor vehicle with a securing bolt having a key-operated lock therein, a plunger operated by the lock and adapted to engage a portion of the wheel carrier to normally lock the bolt against rotation, and a spring-pressed multiple-sided lock barrel adapted to be moved longitudinally of the bolt when the plunger is disengaged with the wheel carrier, whereby a wrench may be applied to the lock barrel to rotate the securing bolt.

These being among the objects of the present invention, the same consists of certain features of construction and combinations of parts to be hereinafter described with reference to the accompanying drawings, and then claimed, having the above and other objects in view.

In the accompanying drawings which illustrate a suitable embodiment of the present invention, Figure 1 is an elevational side view of a vehicle wheel carrier showing the same attached to the rear end of a motor vehicle.

Figure 3 is an enlarged sectional view taken on the line 3—3 of Figure 2 showing the securing bolt in locked position.

Figure 4 is a section similar to Figure 3 showing the securing bolt in unlocked position.

Figure 5 is a partial front elevation of the wheel carrier looking toward the locking bolt.

Figure 6 is a fragmentary sectional view of the locking bolt showing the connection between the lock cylinder and lock plunger.

Figure 1:
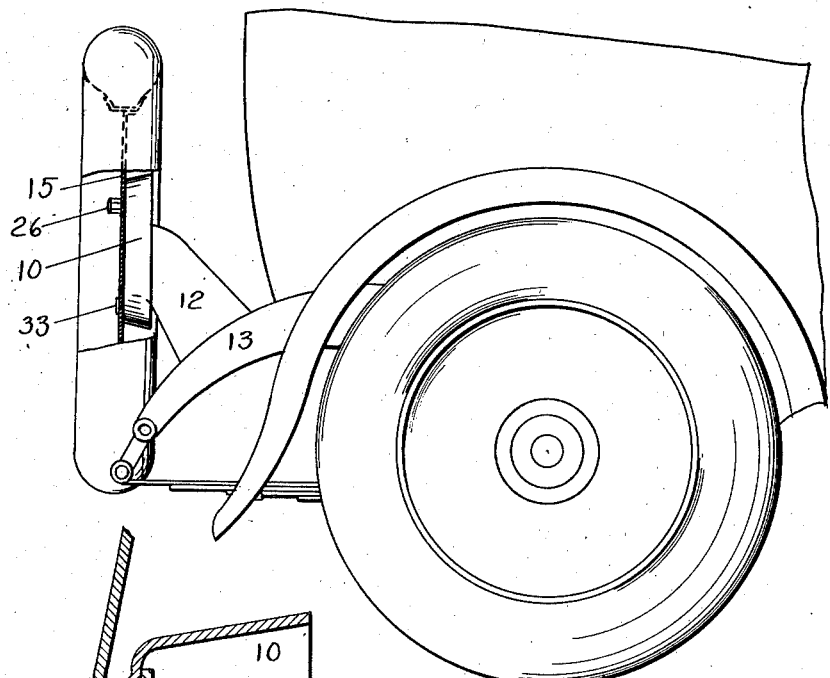

Referring to the accompanying drawings in which like numerals refer to like parts throughout the several views, the spare wheel carrier proper comprises a dish-shaped member 10 which is secured at opposite sides by rivets 11 to the ends of supporting brackets 12. The supporting brackets 12 are preferably supported by and secured to the vehicle frame side rail 13 or a frame cross member (not shown). Openings 14 are formed in the base of the member 10 which are in axial alignment with similar openings in the vehicle wheel 15. A plate 16 is welded or otherwise secured to the inner face of the base of the member 10, and is formed with an aperture which receives a double-ended stud 19 having a collar 17 formed thereon. One end of the stud 19 extends through the apertured plate 16 with the collar 17 abutting against the same, and a nut 18 is threaded on the stud 19 to securely hold the same in place.

Figure 2:
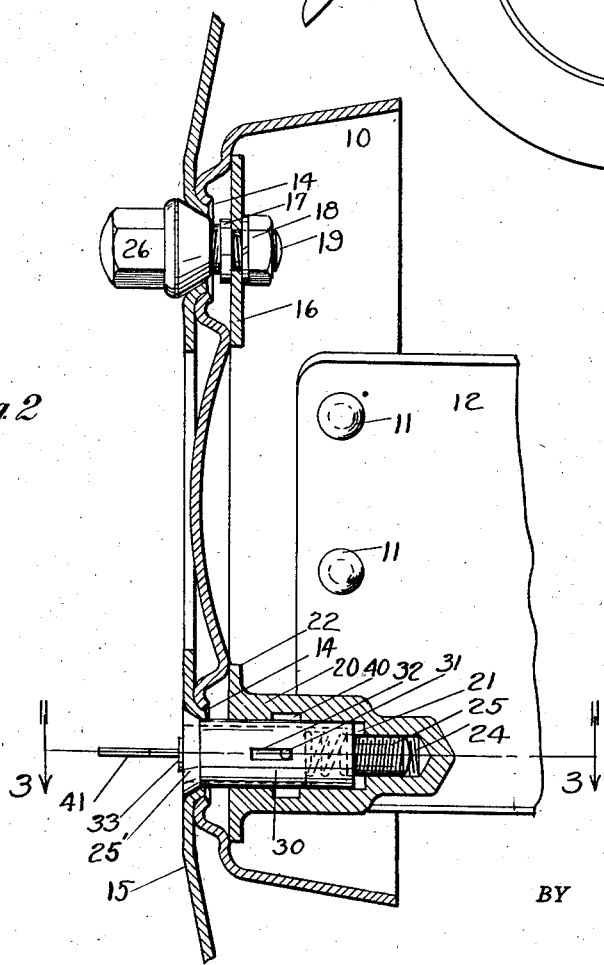
Figure 2 is an enlarged vertical section of the wheel carrier showing the locking means for securing the spare wheel thereto.

As shown in Figures 2 and 3, a housing 20 having a longitudinal passageway 21 therein is secured through its flanges 22 by means of rivets 23 to the inner face of the base of the member 10 with the recess 21 in axial alignment with the lower opening 14 in the base member 10. The housing 20 is also formed with a threaded opening 24 which has the same center line as the passageway 21.

The spare wheel 15 is supported on the carrier member 10 by the stud 19 upon which a nut 26 is threaded, and a bolt 25 which is threaded into the opening 24 of the housing 20. This bolt 25 extends through one of the bolt openings in the wheel 15 and is preferably formed with a head 25' which engages the side of the opening in the wheel 15, similar to a countersunk head, having its end face flush with a surface of the wheel 15 substantially as shown in Figure 3. The bolt 25 is also formed with a cylindrical shank portion 27 which engages the walls of the recess 21 in the housing 20. The shank 27 of the bolt 25 is formed with a multiple-sided passageway 28 which receives a coil spring 29 and slidably receives a similarly-shaped lock barrel 30. The lock barrel 30 is preferably provided with a stop pin 31 which extends into a slotted opening 32 in one of the walls of the recess 28 so that the lock barrel 30 will have limited sliding movement in the shank 27 of the bolt 25. The lock barrel 30 as shown in Figures 3 and 6 receives a rotatable lock cylinder 33 which is provided with an eccentrically-mounted pin 34, the purpose of which will be presently described.

A rectangular-shaped recess 35 extending transversely in the lock barrel 30 adjacent to the lock cylinder 33 receives a plunger 36 having a slotted opening 37 therein into which the eccentrically-mounted pin 34 extends. A coil spring 38 positioned in the recess 35 engages the lower end of the plunger 36 and normally forces the same upwardly as shown in Figure 3, to project through a notch 39 in the shank 27 of the bolt 25, and to extend into a circumferential recess 40 in the housing 20.

The locked position of the bolt 25 is clearly shown in Figure 3, and in this position, the bolt 25 is threaded into the opening 24 so that the wheel 14 is held in clamped position against the base of the member 10. The face of the lock barrel 30 as shown is flush with the face of the wheel 15. The lock barrel 30 is held in this position by the plunger 36 which extends through the notch 39 and projects into the recess 40 in the housing 20. The spring 29 is compressed by reason of the position of the lock barrel 30. It is evident from this view that it would be impossible for a thief to remove the wheel 15 from the wheel carrier because of the fact that there is no possible way in which he could use a wrench, bar or any other device to wreck or break the lock. The only way in which the wheel 15 could be removed from the carrier is by use of the proper key to rotate the locking mechanism. It is also evident that should the bolt 25 be inadvertently loosened, the face of the plunger 36 would engage the wall of the groove 40 and prevent the bolt 25 from being threaded out of the opening 24.

When the proper key 41 is inserted in the lock cylinder 33, the same can be rotated which causes the eccentric pin 34 to engage the bottom wall of the notched opening 37 in the plunger 36 and move the plunger 36 downwardly against the force of the spring 38. As soon as the upper edge of the plunger 36 clears the edge of the opening 39 in the wall of the shank 27 of the bolt 25 and becomes flush with the surface of the lock barrel 30, the coil spring 29 forces the lock barrel 30 to slide outwardly until the stop pin 31 engages the end of the notch 32 in the shank 27 of the bolt 25. This unlocked position is best shown in Figure 4 and it can be seen here that a portion of the lock barrel 30 is exposed a sufficient amount so that a wrench can be used to unthread the bolt 25 from the opening 24 in the housing 20. The nut 26 may then be unthreaded from the stud 19 so that the wheel 15 can be removed from the wheel carrier.

When the wheel 15 is put on the wheel carrier, the bolt 25 is threaded into the opening 24 by a wrench which engages the projecting portion of the lock barrel 30, until the head 25' of the bolt 25 is flush with the surface of the wheel 15. The wheel 15 is then locked on the carrier by pushing the lock barrel 30 inwardly against the pressure of the spring 29 until the plunger 36 is in alignment with the opening 39, and the coil spring 38 forces the plunger to extend through the opening 39 into the recess 40. In this position, the face of the lock barrel 30 is flush with the head 25' of the bolt 25 and no portion of the locking mechanism projects beyond the surface of the wheel 15, which is to be supported by the wheel carrier.

It is evident from the drawings and foregoing description that there are many advantages in the present invention which are not embodied in any of the locking mechanisms used in the past. It is to be understood that this invention is not limited to the use with wheel carriers only, but there are any number of places in which it can be successfully used. It is also to be understood, that certain changes may be made in the specific embodiment of the invention described without departing from the spirit and substance of the broad invention, the scope of which is commensurate with the appended claims.

What I claim is:

1. In a securing bolt having a longitudinal passageway therein, means telescopically received in said passageway for rotating said bolt, said means normally having its end face substantially flush with the end of said bolt, and means for moving said bolt rotating means longitudinally of said bolt to project the same therebeyond, whereby said bolt may be rotated.

2. In a securing bolt having a longitudinal multiple-sided passageway therein, a multiple-sided member slidably positioned in said passageway, normally having its end face substantially flush with the end of said bolt, and a spring positioned in said passageway adapted to move said multiple-sided member longitudinally of said bolt to project the same therebeyond, whereby said bolt may be rotated.

3. In a securing bolt having a longitudinal multiple-sided passageway therein, a multiple-sided member slidably positioned in said passageway for rotating said bolt when in extended position, said member, normally having its end face substantially flush with the end of said bolt, and locking means for normally preventing longitudinal movement of said member relative to said bolt.

4. In a securing bolt having a longitudinal multiple-sided passageway therein, a multiple-sided member slidably positioned in said passageway, normally having its end face substantially flush with the end of said bolt, locking means for normally preventing longitudinal movement of said member relative to said bolt, and a compression spring positioned in said passageway adapted to project said member beyond said bolt upon disengagement of said locking means whereby said bolt may be rotated.

5. In a securing bolt having a longitudinal multiple-sided passageway therein, a multiple-sided lock barrel slidably positioned in said passageway for rotating said bolt, normally having its end face substantially flush with the end of said bolt, a key-controlled lock cylinder rotatably mounted in said lock barrel, a plunger operatable by said lock cylinder adapted to normally engage said bolt for locking said barrel against longitudinal movement relative to said bolt, and means adapted to slidably project said lock barrel beyond said bolt upon disengagement of said lock plunger, whereby a tool may be applied to the projecting portion of said lock barrel to rotate said securing bolt.

6. Means for securing a vehicle wheel on a support comprising, a bolt adapted to be threaded into said support having a longitudinal multiple-sided passageway therein, a multiple-sided lock barrel slidably positioned in said passageway, normally having its end face substantially flush with the end of said bolt, a key-controlled lock cylinder rotatably mounted in said lock barrel, a plunger operatable by said lock cylinder normally engaging a notch in said bolt for locking said barrel against longitudinal movement relative to said bolt, and a compression spring positioned in said passageway adapted to project said lock barrel beyond said bolt upon disengagement of said lock plunger, whereby said bolt may be rotated to remove the same from said support.

7. The combination with a vehicle wheel carrier and a wheel to be supported thereby, of a bolt having a multiple-sided passageway therein for securing said wheel to said carrier, a multiple-sided member telescopically positioned in said passageway, normally having its end face substantially flush with the head of said bolt and with a surface of said bolt and with a surface of said wheel, locking means supported by said multiple-sided member for normally locking said member against movement longitudinally of said bolt, and spring means adapted to project said multiple-sided member beyond said bolt upon disengagement of said locking means, whereby a tool may be applied to the projecting portion thereof to rotate said bolt.

8. The combination with a vehicle wheel carrier and a wheel to be supported thereby, of a securing bolt therefor threaded into said carrier having a longitudinal multiple-sided passageway therein, a multiple-sided lock barrel slidably positioned in said passageway, normally having its end face substantially flush with the end of said bolt and with a surface of said wheel, a key-controlled lock cylinder rotatably positioned in said lock barrel, a plunger actuated by said cylinder adapted to engage said bolt, and means for projecting said lock barrel beyond said bolt upon disengagement of said plunger, whereby a tool may be applied to the projecting portion of said lock barrel to rotate said bolt to permit removal of said wheel from said carrier.

9. The combination with a vehicle wheel carrier and a wheel to be supported thereby, of a bolt housing secured to said carrier and having a circumferential groove therein, a securing bolt having a longitudinal multiple-sided passageway therein threaded into said housing for securing said wheel to said carrier, a multiple-sided lock barrel telescopically positioned in said passageway having its end face flush with the head of said bolt, a key-controlled lock cylinder rotatably mounted in said barrel, a lock plunger actuated by said cylinder extending through a notch in said bolt and extending into said groove in said housing for normally preventing longitudinal movement of said lock barrel and for normally preventing rotation of said bolt, and a compression spring adapted to project said lock barrel beyond said bolt upon retraction of said plunger, whereby a tool may be applied to the projecting portion of said lock barrel for unthreading said bolt from said housing to permit removal of said wheel from said carrier.

Signed by me at South Bend, Indiana, this 19th day of July, 1928.

HARRY G. SMITH.